June 12, 1962 W. D. TIMMONS, JR., ET AL 3,038,891
MEANS FOR CURING BUTYL RUBBER
Filed March 23, 1959
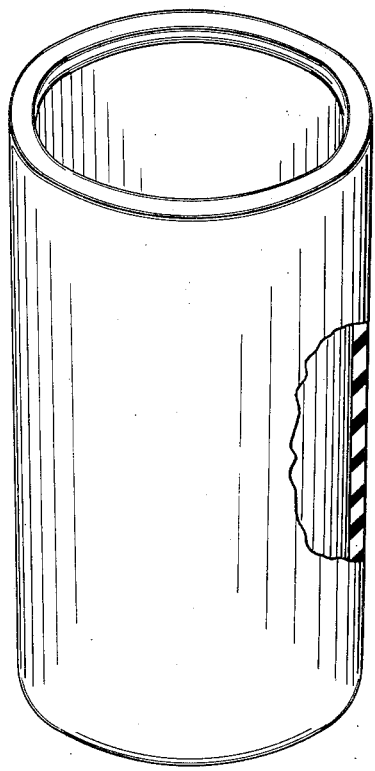

3,038,891
MEANS FOR CURING BUTYL RUBBER
William D. Timmons, Jr., and James J. Robertson, Akron, Ohio, assignors to The Firestone Tire & Rubber Company, Akron, Ohio, a corporation of Ohio
Filed Mar. 23, 1959, Ser. No. 801,311
8 Claims. (Cl. 260—85.3)

The present invention relates to means for vulcanizing isoolefinic-diolefinic copolymers containing small amounts of unsaturation and more particularly to means for vulcanizing butyl rubber.

The advantages of the invention are obtained by heating butyl rubber with the product resulting from reacting a para substituted phenol with an aldehyde in an acid medium and back washing with water or a mild alkali. This reaction product is thought to contain in part a mixture of monomers, dimers and trimers based on the following formula:

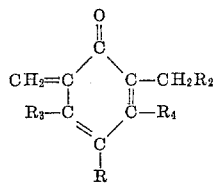

Where R is an alkyl, cycloalkyl, aryl or aralkyl radical, $R_2$ is a hydroxyl group or a halogen atom, and $R_2$ and $R_3$ are selected from the group consisting of hydrogen and lower alkyl radicals.

Butyl rubber is a commercial synthetic rubber formed by copolymerizing an isoolefin, usually isobutylene with a minor portion of a conjugated diolefin, such as isoprene or butadiene. Generally, the isoolefins used have from four to seven carbon atoms and usually are isobutylene or ethyl methyl ethylene. The diolefins employed are open chain conjugated diolefins having from four to eight carbon atoms such as isoprene or butadiene, or other commonly known as being copolymerizable with isobutylene. The proportion of the copolymerized diene present in the copolymer ranges from .5 to 20% of the total weight of the elastomer with about .5% being commercially used. These rubbery copolymers are generally designated in the rubber industry as butyl rubber.

One aspect of the present invention lies in the provision of an improved tire curing bladder for a Bag-O-Matic press such as shown in the FIGURE of drawing. In the vulcanization of pneumatic tires in a Bag-O-Matic press such as disclosed in U.S. Patent 2,495,664 to Soderquist, it is customary to employ an inflatable barrel-shaped form, usually made of vulcanized rubber, and known as a curing bladder or bag. The curing bladder is disposed within the raw tire casing as an aid in shaping the tire, and also for the purpose of applying internal heat and pressure to the tire casing in the molding press in which the tire is vulcanized. For this purpose the bladder is inflated with a fluid heating medium, usually hot water or steam, under pressure, which causes the bladder to expand and thereby forces the tire casing into close conformity with the vulcanizing mold. Upon completion of the vulcanization, the curing bladder is removed from the tire and inserted in another raw tire for a repetition of the curing operation. The bag is thus repeatedly reused for a number of cycles or turns.

The curing bladder is subjected in use to a number of highly deleterious influences which place a definite limitation on the number of times the bag can be reused. Thus, each time a tire is vulcanized, the bag is heated for prolonged periods to vulcanizing temperatures, with the result that the rubbery material from which the bladder is made tends to become over-vulcanized. This condition is aggravated by the fact that the sulfur contained in the raw tire stock in contact with the curing bladder surface tends to migrate or to diffuse into the bag material and such migrated sulfur further vulcanizes the curing bladder to the extreme detriment of its physical properties. Also, the bladder material is subject to oxidative attack as well as reversion with resulting loss of elasticity and strength. Combination of these deleterious service conditions generally results in a rough or checked exterior surface on the bladder which is directly transferred to the interior of a tire cured on the bladder. This leaves the inner tire surface undesirably rough so as to aggravate tube chafing later on in service. The deterioration of the bladder material advances with each successive cycle of use, until finally the bladder develops deep cracks and is no longer fit for use and must be discarded.

The principal object of the invention is to provide means for vulcanizing butyl rubber to yield a product free from the foregoing difficulties. Yet another object of the invention is to provide a butyl rubber composition vulcanized with the product of the reaction of an aldehyde, a para substituted phenol in acid medium, subsequently hydrolyzed with water or a water solution of a chemical such as a weak alkali.

The objects of the invention are obtained by reacting an aldehyde such as formaldehyde with a para substituted phenol such as p-t-amyl phenol while acidifying the system with a halogen acid. The reaction product of the foregoing is back washed with a weak alkali and the resulting product is heated in a mixture of butyl rubber to obtain an improved vulcanized composition and articles made thereof.

More specifically, the vulcanizing agent of the invention may be prepared by reacting one mole of a para substituted phenol with an excess of an aldehyde in the presence of a halogen acid such as hydrochloric acid and washing the resulting product with a weak alkali such as sodium bicarbonate to yield a useful compound which is thought to have a quinone type structure. Although an excess is used, about 2 moles of aldehyde enter into the reaction.

*Example I*

To prepare a curing composition in view of the invention, 133.4 pounds of formalin and 106.8 pounds of hydrochloric acid are added to a clean closed 50 gallon reactor and cooled to 20° C. Sixty-eight pounds of hydrogen chloride are passed into the stirred solution with the temperature being maintained at 20° C. and the excess pressure bled off. The reactor is opened and 60 pounds of p-t-amylphenol is added as rapidly as possible. The reactor is then closed and stirring resumed for about 90 minutes while the temperature is held at 122° F. The reaction is then cooled to 20–25° C., the aqueous phase is drained and 10 pounds of n-hexane is added with stirring. After several washings with water, $NaHCO_3$ is added with stirring until no more than 2% titratable chlorine is present. Titratable chlorine is the percent chlorine by weight determined by titrating the solution with .25 to 5 N sodium hydroxide in a conventional manner. The hexane is removed by vacuum distillation and the end product obtained is a resinous mixture including monomers, dimers and trimers of the following, as shown by infrared analysis:

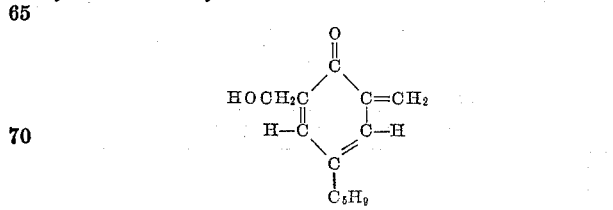

and

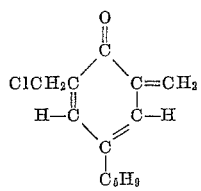

Upon analysis this mixture had 8.81% total chlorine and 8.08% methylol content.

*Example II*

To test the vulcanization characteristics of the mixture of Example I, a mass of butyl rubber was broken down on a two roll mill and the modifying ingredients added according to the following formula:

|  | 3 | 4 | 5 | 6 | 7 | 8 |
|---|---|---|---|---|---|---|
| Butyl Rubber | 100 | | | | | |
| Carbon Black | [1] 40 | | | | | |
| Stearic Acid | 1 | | | | | |
| Zinc Oxide | 5 | | | | | |
| Resin [2] | 2.0 | 5 | 7.5 | 10 | 15 | 20 |

[1] All parts in this and other examples in the specification and claims are based on 100 parts of copolymer by weight.
[2] Made with p-t-amylphenol.

The above compounds were sheeted out on a two roll mill, cured in a platen press and tested with the following physical properties:

| Cured @ 320° F., 300% Modulus, p.s.i.: | | | | | | |
|---|---|---|---|---|---|---|
| 30 min | 150 | 650 | 900 | 1,000 | 1,000 | 775 |
| 60 min | 275 | 850 | 1,150 | 1,250 | 1,150 | 950 |
| 90 min | 275 | 925 | 1,200 | 1,300 | 1,275 | 1,050 |
| 120 min | 300 | 950 | 1,225 | 1,400 | 1,375 | 1,150 |
| Tensile Strength, p.s.i.: | | | | | | |
| 30 min | 375 | 1,650 | 2,075 | 1,975 | 2,075 | 1,825 |
| 60 min | 675 | 1,850 | 2,125 | 2,050 | 2,050 | 1,900 |
| 90 min | 675 | 1,975 | 2,125 | 2,125 | 2,050 | 2,000 |
| 120 min | 700 | 2,000 | 2,200 | 2,175 | 2,025 | 1,950 |
| Ultimate Elongation: | | | | | | |
| 30 min | 1,050 | 650 | 650 | 600 | 640 | 670 |
| 60 min | 910 | 590 | 580 | 530 | 570 | 600 |
| 90 min | 790 | 590 | 540 | 500 | 510 | 590 |
| 120 min | 810 | 590 | 530 | 480 | 470 | 540 |

From the above tests it is seen that use of increasing amounts of the novel vulcanizing agent up to and including 20 parts gives surprisingly good physical properties.

Several investigators have advocated the use of resinous 2,6-dimethylol-4-hydrocarbon substituted phenol as a curing agent for butyl rubber. To make such a resin commercially useful these investigators also have advocated the use of chlorinated polymers such as chlorinated butyl rubber and polychloroprene sold under the generic name of "neoprene" as curing activators for such resins. The vulcanizing agents of the present invention, however, provide a butyl vulcanizate having a faster rate of cure and better physical properties than butyl vulcanizates cured with such chlorinated polymer activated 2,6-dimethylol phenol resins. This phenomenon is shown in Example III.

*Example III*

To show the advantages of the resin of the invention the following stocks were mixed on a two roll mill:

|  | 9 | 10 |
|---|---|---|
| Butyl Rubber | 90 | 100 |
| Carbon Black | 40 | 40 |
| Stearic Acid | 1 | 1 |
| Neoprene | 10 | |
| Zinc Oxide | 5 | 5 |
| Amberol St. 137 [1] | 10 | |
| Novel Resin [2] | | 10 |

[1] 2,6-dimethylol-octyl phenol sold by Rohm and Haas.
[2] p-t-amylphenol reacted with formaldehyde.

The above stocks were sheeted out on a two roll mill, cut into pads, cured in a platen press and tested with the following results:

| Cured @ 320° F., 300% Modulus, p.s.i.: | | |
|---|---|---|
| 30 min | 975 | 1,025 |
| 60 min | 1,250 | 1,250 |
| 90 min | 1,325 | 1,400 |
| 120 min | 1,350 | 1,450 |
| Tensile Strength, p.s.i.: | | |
| 30 min | 1,775 | 2,050 |
| 60 min | 1,800 | 2,075 |
| 90 min | 1,850 | 2,050 |
| 120 min | 1,850 | 1,975 |
| Ultimate Elongation: | | |
| 30 min | 490 | 610 |
| 60 min | 410 | 520 |
| 90 min | 400 | 470 |
| 120 min | 390 | 430 |

The above tests show that use of vulcanizing agents of this invention gives a butyl vulcanizate having a faster rate of cure than the prior art "neoprene" activated 2,6-dihydroxy phenol resin cured butyl compounds.

The novel composition (10) also had higher modulus, higher tensile and better elongation properties than the control composition 9.

Stocks such as 1–8 and 10 have excellent heat resistant characteristics when used in curing elements such as curing pads, tire curing bags and Bag-O-Matic bladders such as generally indicated at 1 in the figure of drawing. These compositions are useful as butyl rubber tread and body compounds for tires as well as butyl rubber molded and extruded goods.

Although preparation of the novel resin curing agent has been illustrated by the use of p-octyl and p-amylphenol, other phenols such as p-t-nonylphenol are useful. Also useful are p-tertiary butyl phenol, p-phenylphenol, p-benzylphenol, p-(alpha, alpha dimethyl benzyl) phenol, p-dodecyl phenol, p-cyclohexyl phenol and p-isobornylphenol. The phenol used in the invention must have an alkyl, cycloalkyl, aryl or aralkyl radical in the para position such as in the examples given.

The curing agents of the invention give higher physical properties with increasing amounts of titratable chlorine. Likewise, the physical properties of such vulcanizates of the invention may be varied by varying the amount of titratable chlorine left in the reaction product. Washing with sodium bicarbonate removes titratable chlorine so that the more washing, the more titratable chlorine removed. When the reaction product is not back-washed to remove the titratable chlorine, the butyl vulcanizates cured with the resulting curing agent (which are outside of the present invention) have high physical properties but are extremely scorchy or prone to "precure" during factory processing, as shown by Mooney Tc and Ts values. This makes such vulcanizates practically useless in molded products, such as tire curing bags, where heavy members must be extruded at rather high temperatures.

On the other hand, the curing agents formed in view of the present invention may have scorch values adjusted by wash-back with the hydrolyzing agent. Resins with little or no titratable chlorine have no cure at all, while stocks with about .8% titratable chlorine have practically no set-up as shown by Tc and Ts values. Increasing amounts of titratable chlorine give increased physical properties and corresponding increases in viscosity as shown by Tc and Ts values.

While different uses of the vulcanizates of the invention will determine what range of viscosity and physical properties are desired or permitted by processing conditions, a critical range of from .2% to 6% titratable chlorine is useful. For butyl rubber vulcanizates extruded and shaped into tire curing elements, a critical range of from .8 to 4% is most useful, while a critical range of from 1 to 2% is preferred.

Not only may the aldehyde phenol reaction system be saturated with hydrogen chloride and hydrochloric acid, but in modifications of the invention the system may be saturated with hydrogen bromide, hydrogen iodide or with proper precautions, with hydrogen fluoride.

In washing the product of the aldehyde phenol and acid, not only has sodium bicarbonate been found useful, but dilute solutions of sodium or potassium hydroxide, sodium carbonate and other basic materials may be used. The pH of the wash must be kept above 7. A critical pH range of 7–11 is useful, while the critical range of the preferred form of the invention is a pH of from 7 to 9. Buffer salts such as sodium hexametaphosphate, sodium polyphosphates and potassium pyrophosphate are useful in maintaining the proper pH value of the solution alone or when the more powerful alkalies are used.

The heat treatment of the vulcanizates of the invention can be effected at temperatures as low as 220° F. up to the point where the stock would be injured by thermal decomposition. The preferred temperature range employed is at least 280° F. to about 400° F. Those skilled in the art will recognize that time and temperature are inversely correlated.

In butyl rubber vulcanizates of the invention a critical range of from 1 to 20 parts of the reaction product is useful, while the critical range of the preferred form of the invention is from 5 to 8 parts, all based on the weight of rubber hydrocarbon present.

While certain examples of the invention have been shown by way of illustration, what is claimed for protection by Letters Patent is:

1. A vulcanized rubbery composition comprising a rubbery copolymer of from 80 to 99.5% of an isoolefin having from 4 to 7 carbon atoms with correspondingly 20 to 0.5% of a conjugated diolefin having from 4 to 8 carbon atoms, said copolymer being vulcanized with from 2 to 20 parts by weight per 100 parts by weight of said copolymer of a material resulting from treating with weak alkali the reaction product of one mole of a para-hydrocarbon substituted phenol with at least two moles of formaldehyde in the presence of a hydrogen halide selected from the group consisting of hydrogen chloride and hydrogen bromide, the hydrocarbon substituent of said phenol being selected from the group consisting of alkyl, cycloalkyl, aryl and aralkyl radicals.

2. A vulcanized rubbery composition according to claim 1 wherein the hydrogen halide is hydrogen chloride.

3. A vulcanized rubbery composition according to claim 1 wherein the hydrogen halide is hydrogen chloride and the weak alkali is sodium bicarbonate.

4. A vulcanized rubbery composition according to claim 1 wherein the hydrogen halide is hydrogen chloride, the weak alkali is sodium bicarbonate and the hydrocarbon substituent is a t-amyl group.

5. A vulcanized rubbery composition according to claim 1 wherein the hydrogen halide is hydrogen bromide.

6. A vulcanized rubbery composition according to claim 1 wherein sufficient weak alkali has been employed to result so that the titratable halogen content of said material is from 0.2 to 6.0%.

7. A curing element adapted to assume an annular resilient form to conform to the interior contour of a pneumatic tire casing and defining an interior cavity inflatable with a fluid medium to cause a tire casing to conform to a tire vulcanizing mold, said curing element comprising a vulcanized rubbery copolymer of from 80 to 99.5% of an isoolefin having from 4 to 7 carbon atoms with correspondingly 20 to 0.5% of a conjugated diolefin having from 4 to 8 carbon atoms, said curing element being vulcanized with from 2 to 20 parts by weight per 100 parts by weight of said copolymer of a material resulting from treating with weak alkali the reaction product of one mole of a para-hydrocarbon substituted phenol with at least two moles of formaldehyde in the presence of a hydrogen halide selected from the group consisting of hydrogen chloride and hydrogen bromide, the hydrocarbon substituent of said phenol being selected from the group consisting of alkyl, cycloalkyl, aryl and aralkyl radicals.

8. A method of vulcanizing a butyl rubber composition comprising treating said composition with from 2 to 20 parts by weight per 100 parts by weight of said butyl rubber of a material resulting from treating with weak alkali the reaction product of one mole of a para-hydrocarbon substituted phenol with at least two moles of formaldehyde in the presence of a hydrogen halide selected from the group consisting of hydrogen chloride and hydrogen bromide, the hydrocarbon substituent of said phenol being selected from the group consisting of alkyl, cycloalkyl, aryl and aralkyl radicals.

References Cited in the file of this patent

UNITED STATES PATENTS

| | | |
|---|---|---|
| 2,701,895 | Tawney et al. | Feb. 15, 1955 |
| 2,726,224 | Peterson | Dec. 6, 1955 |
| 2,912,395 | Graham | Nov. 10, 1959 |

UNITED STATES PATENT OFFICE

CERTIFICATE OF CORRECTION

Patent No. 3,038,891            June 12, 1962

William D. Timmons, Jr., et al.

It is hereby certified that error appears in the above numbered patent requiring correction and that the said Letters Patent should read as corrected below.

Column 1, lines 29 and 30, for "$R_2$ and $R_3$" read -- $R_3$ and $R_4$ --.

Signed and sealed this 15th day of December 1964.

(SEAL)
Attest:

ERNEST W. SWIDER
Attesting Officer

EDWARD J. BRENNER
Commissioner of Patents